April 13, 1926.
W. L. McLAINE
1,580,558
FLOW NIPPLE
Filed Oct. 18, 1922
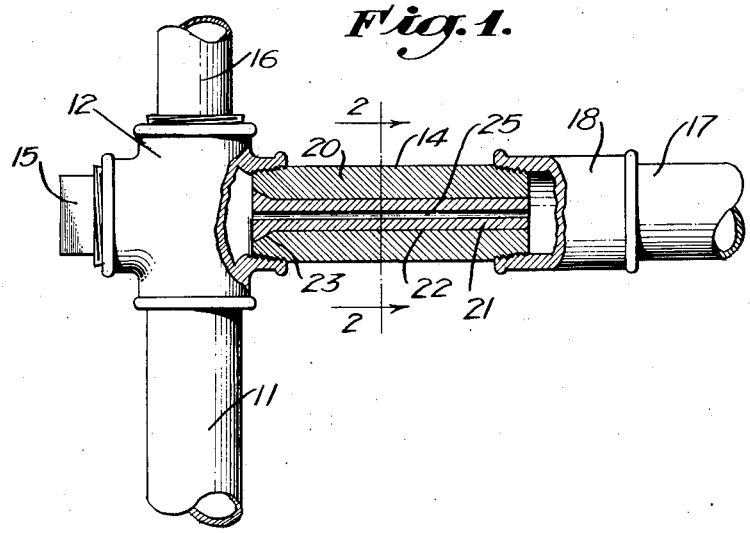
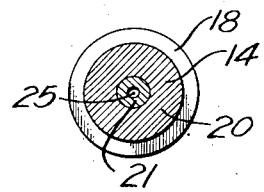
INVENTOR:
WILLIAM L. McLAINE,
BY
Graham + Laine
ATTORNEYS.

Patented Apr. 13, 1926.

1,580,558

UNITED STATES PATENT OFFICE.

WILLIAM L. McLAINE, OF LOS ANGELES, CALIFORNIA.

FLOW NIPPLE.

Application filed October 18, 1922. Serial No. 595,382.

*To all whom it may concern:*

Be it known that I, WILLIAM L. MCLAINE, a citizen of the United States, residing at Los Angeles, county of Los Angeles, State of California, have invented a new and useful Improvement in Flow Nipples, of which the following is a specification.

My invention relates to oil wells and particularly to those wells which flow naturally under considerable pressure. It has been found that where the pressure in the oil bearing formations is high the well can be prevented from sanding up if this pressure is restrained and the well not allowed to flow freely under the full pressure. For the purpose of allowing the well to flow, but of holding a considerable pressure on the well, the oil operators make a practice of inserting in the pipe lines leading from the well, a member called a flow nipple which is in effect a solid bar of steel threaded on either end so that it can be coupled into the pipe line like an ordinary nipple, this bar having a small orifice therethrough which acts as a constriction, choking back the natural tendency of the well to flow and thus holding a pressure thereupon. In some wells in California this pressure may amount to as much as 1500 pounds per square inch and pressures of a few hundred pounds per square inch are not uncommon.

In the operation of these high pressure wells it is common to experiment to determine just what size of orifice is the best, it not being uncommon to find a well flowing as high as two or three thousand barrels a day through a half inch or three quarter inch orifice. Since most of these wells carry some sand and the oil flows through the flow nipples at a very high velocity it is evident that considerable cutting is bound to take place in the flow nipple even where, as is the common practice, they are made of very hard steel.

It is therefore necessary to frequently change these nozzles not only on account of the cutting but also for the purpose of changing the size of the orifice as conditions change at the well. Since the larger wells on which it is usual to use a flow nipple are provided with heavy fittings, it is a somewhat difficult matter to take out the flow nipple when it becomes worn and insert another.

It is an object of my invention to provide a flow nipple which is so constructed that it can be permanently secured in place in a flow line but which is so constructed that the size of orifice can be very quickly changed without requiring the use of heavy pipe tools and wrenches.

It is a further object of my invention to provide a flow nipple in which the portion subjected to the cutting action of the oil is readily removable and which is so constructed that it is cheap to replace.

A still further object of my invention is to provide a flow nipple in which the removable member is so constructed that it can be readily made and easily tempered and hardened.

Further objects and advantages will be made evident hereinafter.

Referring to the drawing which is for illustrative purposes only:

Fig. 1 is an elevation of my invention as applied to an oil well.

Fig. 2 is a section on a plane represented by the line 2—2 of Fig. 1.

In the form of the invention shown 11 is a line of tubing in an oil well, the flow of oil being upwardly therein, this flow being caused by the natural pressure of the gas and oil in the formations from which the oil is drawn. 12 is a cross fitting into which tubing 11 is threaded and into which are also threaded a flow nipple 14, a pipe plug 15, and any sort of a pipe or plug 16. Oil is normally delivered through the flow nipple 14 into a flow line 17 through a collar 18.

The flow nipple 14 consists of an outer soft steel member 20 which is externally threaded with standard pipe threads to fit into the cross 12 and the collar 18, and which is internally bored to fit an inner member 21. This member is made of tool steel, hardened, and preferably consists of a cylindrical body 22 and a conical head 23. The head 23 bears and fits tightly in a conical portion of the bore of the outer member 20 and forms a gas and oil tight seal therein. The flow of oil through the nipple being from left to right as shown in Fig. 1, it is evident that the natural gas pressure of the well seats the member 21 tightly in the member 20, the oil flowing through a hole 25 bored through the inner member 21.

This hole acts as a constriction on the flow of oil, and the friction on the oil flowing through this constriction builds up the pressure in the well holding back the flow of oil and preventing sanding up of the well.

When the hole 25 becomes enlarged by the flow of the oil therethrough, or when it is desired to change the size of the orifice 25 for any purpose, the flow of oil is shut off by means of a valve, not shown, in the tubing 11 below the flow nipple, or by any other convenient means, and the pipe plug 15 is removed from the cross fitting 12. It is then possible to reach into the cross fitting and insert a hooked wire or other convenient means into the hole 25 and pull the inner member 21 out of its seat in the member 20 and entirely out of the cross fitting through the hole normally closed by the pipe plug 15. It is also possible to insert a new inner member 21 having a hole 25 of any convenient size and after the plug 15 has been replaced the well can again be put on production.

I claim as my invention:

1. A flow nipple for oil wells comprising: an outer member adapted to be secured in a flow line; and an inner member having a conical exterior portion fitting in gas tight relationship in a conical portion of a hole extending longitudinally through said outer member, said inner member having an opening extending longitudinally therethrough.

2. A flow nipple for oil wells comprising: an outer member adapted to be secured in a flow line; and an inner member fitting tightly in a hole extending longitudinally through said outer member, said inner member having an opening extending longitudinally therethrough, said inner member having a conical exterior fitting into a conical hole in said outer member, said conical exterior extending along only a portion of the length of said inner member.

3. A flow line assembly for an oil well comprising: a tubing; a pipe fitting having at least three openings therein, two of which are on the same axis, the tubing being connected into a third opening which is upon a different axis; means for closing one of said axial openings; and a flow nipple as described in claim 1 fitting into the other of said axial openings.

4. A flow line assembly for an oil well comprising: a tubing; a pipe fitting having at least three openings therein, two of which are on the same axis, the tubing being connected into a third opening which is upon a different axis; means for closing one of said axial openings; and a flow nipple as described in claim 1 fitting into the other of said axial openings, the inner member of said flow nipple being so constructed that it may be withdrawn from said outer member through said axial openings.

5. A flow nipple for oil wells having a tapering bore and a tapering bushing adapted to be seated therein.

6. A flow nipple comprising: a body member having a smooth longitudinal bore formed to provide a tapered seat at its inlet end; and a removable lining freely slidable axially into said bore in the direction of flow to engage said seat.

In testimony whereof, I have hereunto set my hand at Los Angeles, California, this 12th day of October, 1922.

WILLIAM L. McLAINE.